United States Patent [19]

Peppler

[11] 4,375,791
[45] Mar. 8, 1983

[54] TROUGH FEEDER

[75] Inventor: William Peppler, Decatur, Ala.

[73] Assignee: Chore-Time Equipment, Inc., Milford, Ind.

[21] Appl. No.: 278,856

[22] Filed: Jun. 29, 1981

Related U.S. Application Data

[63] Continuation of Ser. No. 127,595, Mar. 6, 1980, abandoned.

[51] Int. Cl.³ .............................................. A01K 5/00
[52] U.S. Cl. .................................. 119/52 AF; 119/53
[58] Field of Search ................. 119/18, 52 AF, 51.11, 119/53

[56] References Cited

U.S. PATENT DOCUMENTS 3,523,519 8/1970 Hostetler .............................. 119/18
3,776,191 12/1973 Murto .................................. 119/18

Primary Examiner—Hugh R. Chamblee
Attorney, Agent, or Firm—Trexler, Bushnell & Wolters, Ltd.

[57] ABSTRACT

Apparatus for distributing feed to caged poultry and the like is disclosed. The apparatus comprises an elongated trough for receiving feed, and an open-topped tube conveyor disposed within the trough. A clip is provided for securing the tube conveyor in and to the trough. A tube shield extends from a trough wall down over the conveyor tube. A baffle extends downwardly from the tube shield over each feed-dispensing tube aperture to prevent observation of feed particle dispensing motion by the receiving poultry.

6 Claims, 10 Drawing Figures

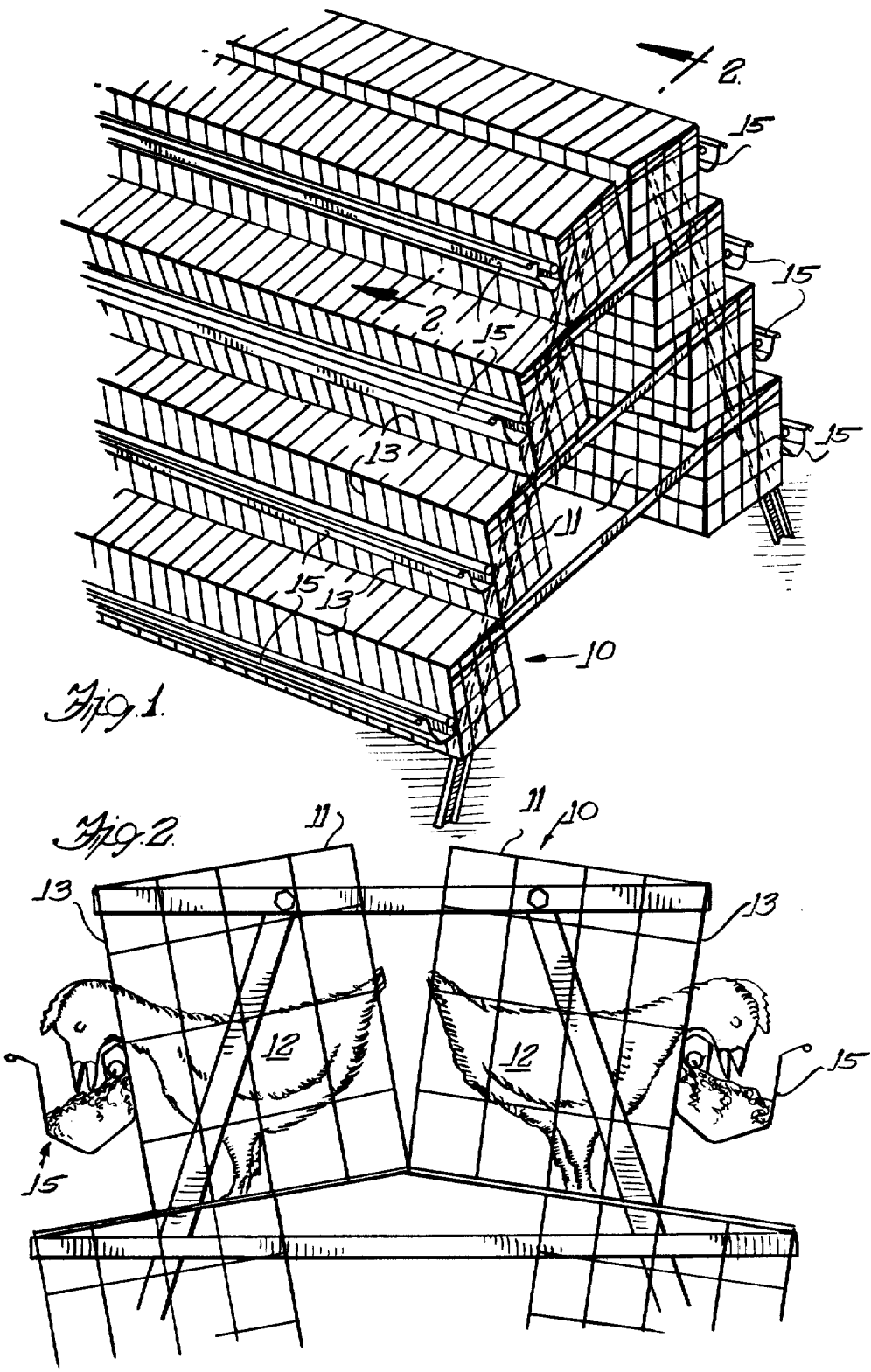

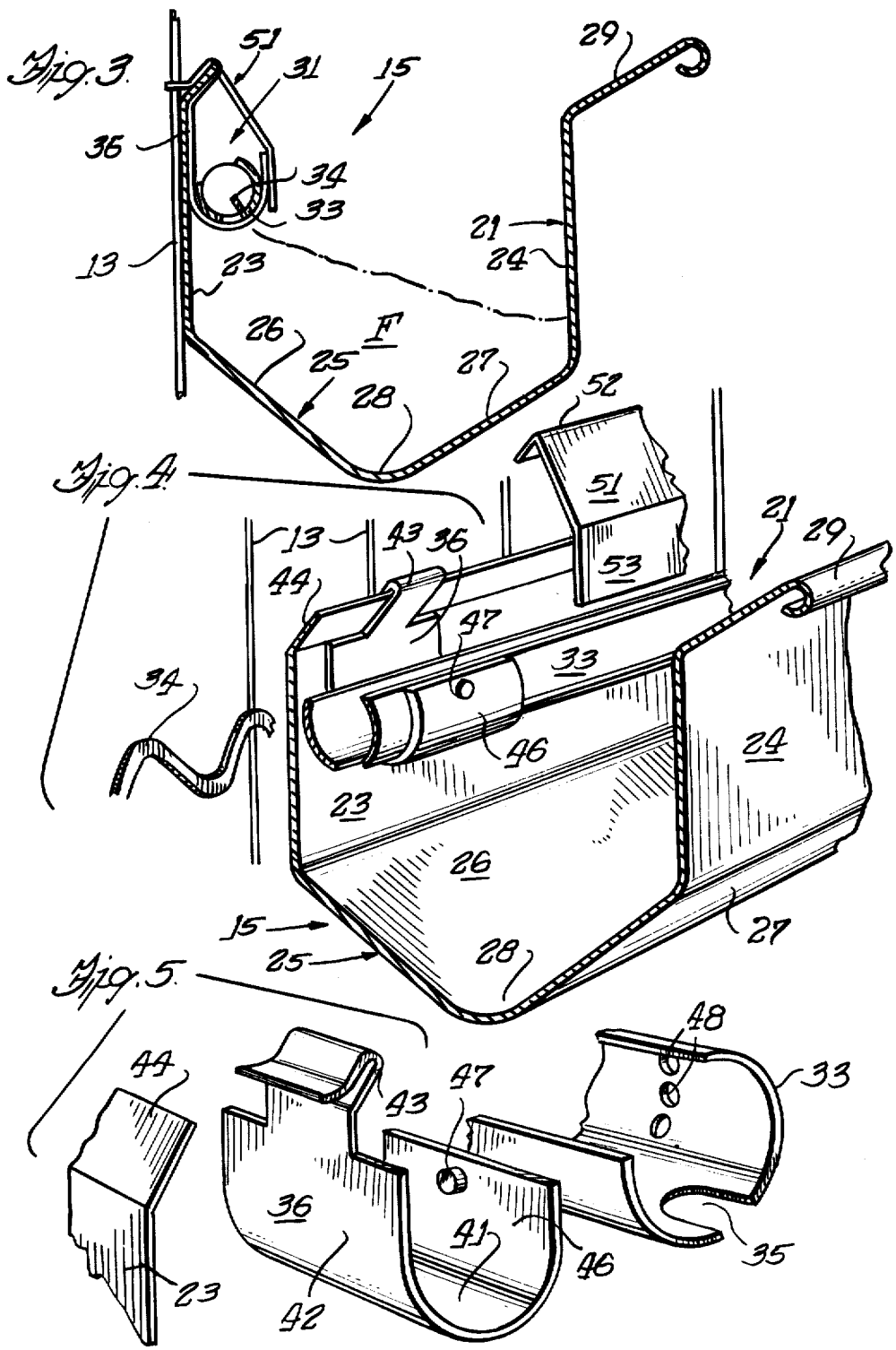

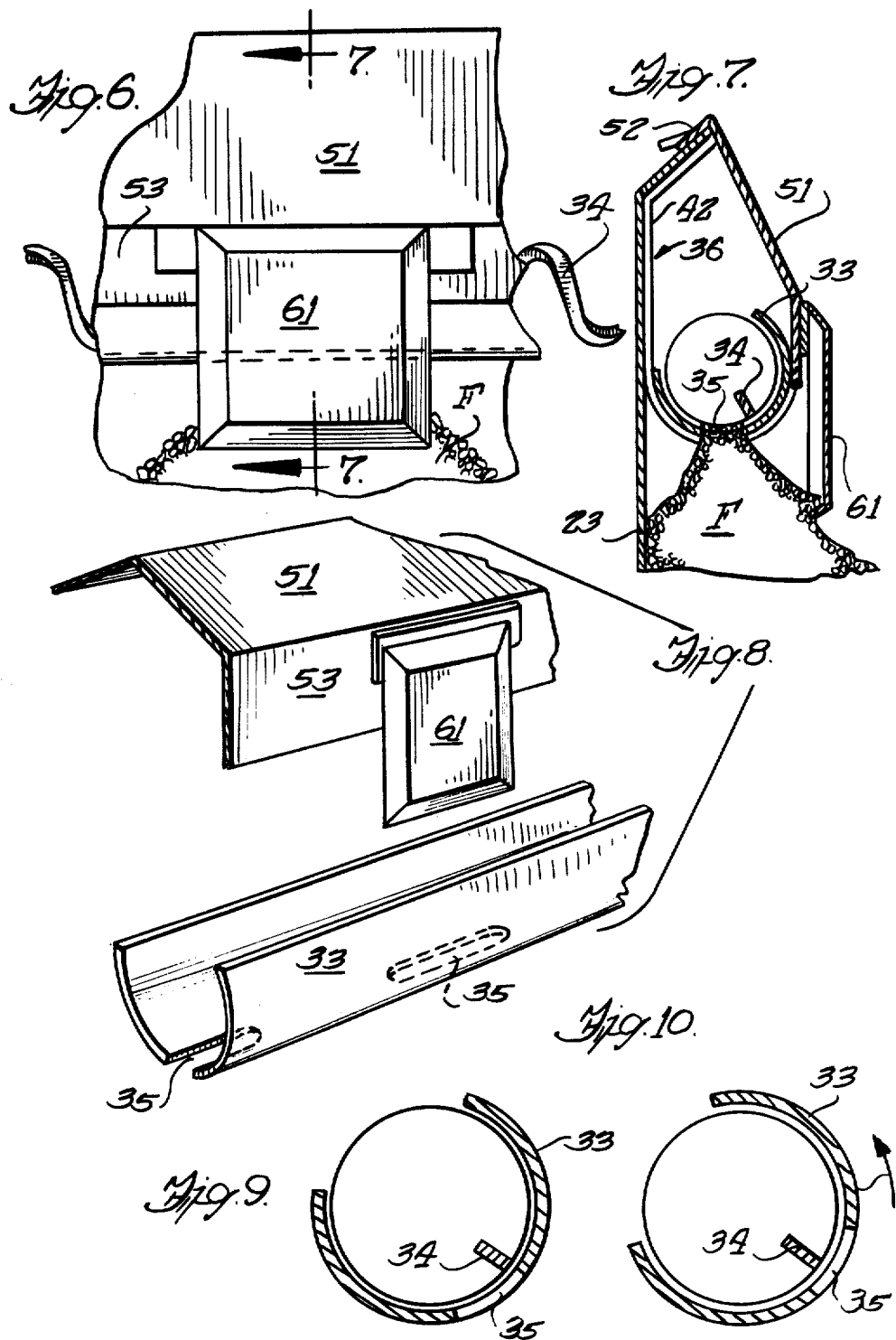

TROUGH FEEDER

This application is a continuation of application Ser. No. 127,595, filed Mar. 6, 1980, now abandoned.

BACKGROUND OF THE INVENTION

This invention relates generally to feeding apparatus for poultry and like animals and more particularly concerns a low-cost yet effective trough feeder for use with caged poultry.

In recent years, advances in poultry care equipment have provided relatively trouble-free delivery of feed rations to caged poultry. U.S. Pat. Nos. 3,611,995; 3,776,191; and others disclose and claim such equipment.

It is the general object of the present invention to provide a trough and feed conveyor unit at minimal cost which dispenses particulate feed and then offers the dispensed feed to poultry or like animals with maximum effectiveness.

It is another object of the invention to provide a trough and feed conveyor unit which can be erected quickly and inexpensively by even inexperienced personnel.

Yet another object is to provide a trough and feed conveying system which inhibits feed separation or improper feed distribution.

Still another object is to provide a trough feed conveying system which discourages poultry from picking over feed which has been dispensed into the trough.

Other objects and advantages of the invention will become apparent upon reading the following detailed description and upon reference to the drawings. Like reference numerals refer to like parts throughout the drawings.

BRIEF DESCRIPTION OF THE DRAWINGS

FIG. 1 is a perspective view showing a novel trough and feed conveying system as it appears when it is to be used with an array of poultry-containing cages;

FIG. 2 is a fragmentary elevational view showing the feed conveyor and trough of the present invention as the troughs and conveyors appear when installed adjacent the poultry-containing cages;

FIG. 3 is an end view in partial section showing the conveyor and trough in greater detail;

FIG. 4 is a partially exploded view showing the feed retaining trough and accompanying conveyor;

FIG. 5 is an exploded view showing a means by which a feed conveying tube can be mounted in and upon the trough;

FIG. 6 is a fragmentary elevational view showing a portion of the feed trough and conveyor and an accompanying baffle plate;

FIG. 7 is a fragmentary elevational view in section taken substantially in the plane of line 7—7 in FIG. 6;

FIG. 8 is an exploded view showing the relationship of a feed-conveying conveyor tube, a trough shield, and an accompanying trough baffle;

FIG. 9 is a fragmentary elevational view in section showing the feed conveyor tube and an accompanying auger and a feed dispensing hole in a given position; and FIG. 10 is a view similar to FIG. 9 but showing the feed tube hole in an alternative position.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning first to FIGS. 1 and 2, there is shown an array 10 of cages 11 adapted to contain poultry 12 or like animals. Mounted along cage fronts 13 are the combination feed receiving and displaying trough and conveyor units 15 of the present invention. These conveyors and trough units 15 are mounted outside the poultry cages 11 to provide maximum space inside the cages 11, and to present delivered feed at a position where the contained poultry 12 will find and want to consume it.

As shown more particularly in FIGS. 3 and 4, the novel trough and feeder units 15 include a trough 21 which here comprises an elongated member formed of galvanized steel or like suitable material. In accordance with one aspect of the invention, this trough 21 can be fabricated at minimum expense, shipped conveniently and erected quickly and easily. To this end, the trough member 21 is generally U-shaped, and includes a first vertical or upstanding wall 23 and a second generally upstanding wall 24 joined together by a V-shaped bottom 25. The bottom 25 can be considered to be defined by inclined portions 26 and 27 joined by a smoothly rounded lower portion 28. A shield 29 atop the second wall 24 inhibits the loss of feed when the poultry toss it about. Tossed feed is simply directed back toward and into the trough body by the shield 29.

The first wall 23 is disposed adjacent the cage front elements 13. Within the trough 21 and adjacent that first wall 23, the conveyor 31 is located. This conveyor comprises a conveyor tube 33 carried adjacent the first or inner trough wall 23 by a cradle chip 36. To reduce the cost of manufacture and simplify and reduce the cost of shipping in accordance with the invention, this conveyor tube 33 need not be entirely closed; that is, it can be somewhat U-shaped and open at the top as shown in FIGS. 3-5 and 7-10. To urge granular feed along this conveyor tube 33, an open helical auger member 34 is disposed within the conveyor tube 33. When the auger member 34 is rotated by an electric motor (not shown) or other suitable means, feed is urged along the conveyor tube 33.

This feed F can be dispensed through apertures or elongated holes 35 defined in the tube member 33 (FIGS. 5 and 7-10). The dispensation of a proper feed mix is encouraged by forming these apertures 35 so that they are elongated or of maximum dimension in a direction substantially parallel to the axis of the conveyor tube 33.

To hold the conveyor 31 in the positions illustrated in FIGS. 3, 4 and 7, the clip 36 is provided with a lower or cradle portion 41, an upwardly extending leg 42, and a reversely turned attachment portion 43 (FIG. 5). This attachment portion 43 is formed so as to fit snugly over a diagonally inwardly turned portion 44 of the first or inner trough leg 23. In this way, the conveyor 31 is inexpensively held in the trough 21, but is spaced above the trough bottom 25.

At a distal end 46 of the clip cradle 41, an interconnector pin embossment 47 is located to engage any one of a number of mating apertures or holes 48 formed in the conveyor tube 33. By selecting an appropriate hole 48, the feed dispensing aperture 35 can be located relatively at or away from the lowest portion of the conveyor tube 43, as can be envisioned from a comparison of FIGS. 9 and 10.

In carrying out the invention, proper amounts and mixes of the granular feed can be dispensed into the trough 21 by appropriately adjusting the angular position of the conveyor tube 33 as these figures suggest. Experimentation has indicated that good feed distribution and dispensation can be obtained by positioning conveyor tube sections nearest the feed-supply end so that the tube holes are located at a relatively high spot on the tube, as indicated in FIG. 10. Tube sections located at the opposite end of the elongated trough and conveyor preferably have their holes located at or near the lowest point or bottom of the tube. Intermediate tube sections are positioned to locate their tube holes 35 at intermediate locations as indicated in FIG. 9. If the position of these holes 35 were to be observed, the observer would note that, at or near that end of the conveyor which receives feed from a supply source (not shown), the dispensing holes 35 are located with maximum angular displacement from the tube section bottoms, and that this angular displacement is in a direction toward the center of the underlying trough. Tube sections at the opposite end of the conveyor are disposed so as to locate the holes 35 most nearly (or at) the tube section bottoms. In this way, a hole array of descending, stepped, elongated, helical configuration is provided.

To prevent contamination of the feed being conveyed, and to inhibit the motion of the feed and auger 34 from being observed or pecked at by the caged poultry 12, a tube shield 51 is mounted in the position illustrated in FIGS. 3, 4, 6 and 7 over the conveyor tube 33. Here, this shield 51 is provided with an elongate finger portion 52 adapted to rest on or be secured over the diagonally upstanding trough element 44. A shield skirt 53 extends downwardly past the upper portions of the conveyor tube 33.

As indicated above, it is an object of the present invention to inhibit the caged poultry 12 from playing with feed F dispensed into the trough. It has been found that poultry are especially liable to play with or pick over this feed when they observe feed particle motion as the feed is being delivered. To discourage this observation, a baffle member 61 is secured to the shield member 51 so as to depend from the shield skirt 53 as illustrated in FIGS. 6–8 inclusive. These baffle members 61 can be either affixed to or formed in and on the shield skirt 53 wherever the conveyor tube feed dispensing apertures 35 are located but the baffle members 61 are spaced apart from the apertures 35. As can be envisioned, feed particles falling from the apertures 35 cannot be observed by the caged poultry. Preferably, each baffle member 61 has a greater dimension in the direction of the tube 33 axis than the tube aperture 35 which the baffle member 61 covers, in order to provide a complete particle motion hiding effect.

The invention is claimed as follows:

1. Apparatus for distributing feed to poultry and the like comprising the combination of trough for receiving feed and for presenting the received feed to the poultry, a conveyor tube, means for urging feed along the conveyor tube, and securing clip means for securing the tube in fixed relation to the trough and extending at least partly around the conveyor tube, pin means on said securing clip means, and a plurality of pin-receiving recesses defined in and on said tube to permit said tube to be connected to said securing clip means in any one of a plurality of angular positions, and tube shield means extending over the conveyor tube.

2. Apparatus according to claim 1 wherein said shield has a greater dimension, measured axially along the direction of the tube axis, than the covered aperture.

3. Apparatus according to claim 1 wherein said conveyor tube comprises a plurality of communicating tube sections extending from a conveyor feed supply end to an opposite conveyor end, each tube section defining at least one tube aperture, and wherein the conveyor tube sections are positioned so as to locate the tube holes in a stepped helical array.

4. Apparatus according to claim 1 wherein said tube shield means at least partly covers said tube at a tube feed drop-out aperture.

5. Apparatus for distributing feed to poultry and the like comprising the combination of a trough for receiving feed and for presenting the received feed to the poultry, a conveyor tube, means for urging feed along the conveyor tube, securing clip means for securing the tube in fixed relation to the trough and pin and recess interconnector means between the securing clip means and conveyor tube to permit said tube to be connected to said securing clip means in any one of a plurality of angular positions, and tube shield means extending over the conveyor tube.

6. Apparatus according to claim 1 wherein said tube shield means at least partly covers said tube at a tube feed drop-out aperture.

* * * * *